Aug. 9, 1949.  J. C. AUTEN  2,478,355
SYNCHRONIZER
Filed April 23, 1945
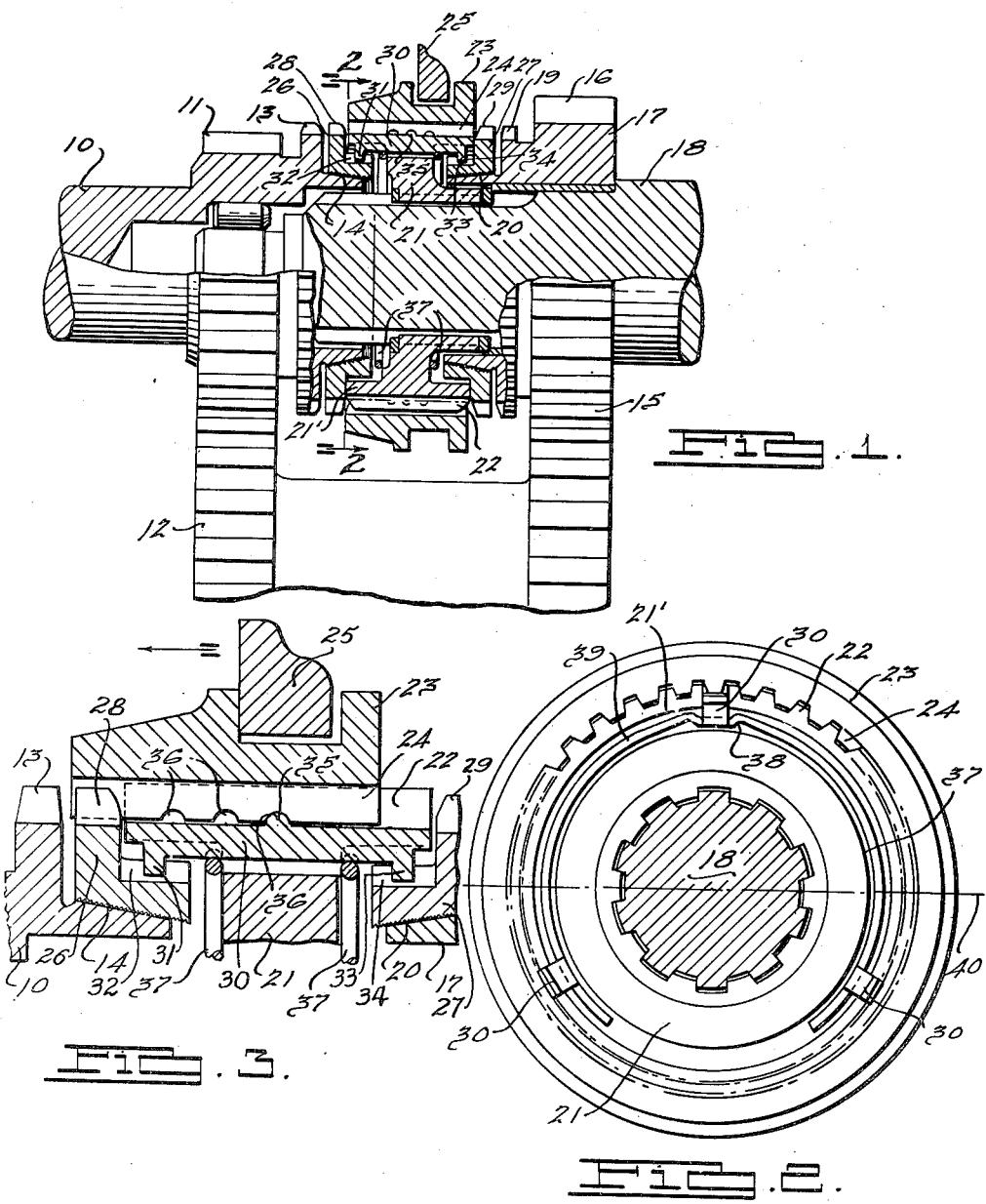
INVENTOR.
Jay C. Auten.
BY Harness & Harris
ATTORNEYS.

Patented Aug. 9, 1949

2,478,355

UNITED STATES PATENT OFFICE 2,478,355

SYNCHRONIZER

Jay C. Auten, Royal Oak, Mich., assignor to Chrysler Corporation, Highland Park, Mich., a corporation of Delaware Application April 23, 1945, Serial No. 589,743

4 Claims. (Cl. 192—53)

1

This invention relates to improvements in a power transmitting mechanism and more particularly to a mechanism including torque transmitting members adapted to be positively clutched together under control of a blocker-synchronizer member.

An object of the invention is the provision of improvements for moving the blocker-synchronizer into frictional engagement with one of the clutching members in response to clutching shift of the other thereof whereby the friction surfaces so engaged are maintained in concentric relationship during engaging movement thereof.

In carrying out the foregoing, releasable operating connection is provided between the shiftable clutch member and the blocker-synchronizer including a plurality of spaced actuators, each operable to exert a thrust of substantially equal magnitude against the blocker-synchronizer member for engagement of the aforesaid friction surfaces during a portion of the clutching shift of the shiftable clutch member. The actuators are urged into releasable connection with the shiftable clutch member by spring means so arranged as to exert a thrust of equal magnitude against each actuator.

A still further object of the invention is to facilitate engagement of clutching members by establishing a substantially synchronous relationship therebetween during various stages of shift of the clutching member through successive releasable connections between the shiftable member and the blocker-synchronizer member by the medium of the aforesaid actuators.

Other objects and advantages of the invention will be more apparent from the following description taken in connection with the accompanying drawing, wherein:

Fig. 1 is a side elevational view, mainly in section, of a portion of a transmission embodying the invention.

Fig. 2 is a transverse section taken as indicated by the line 2—2 of Fig. 1.

Fig. 3 is an enlarged, fragmentary sectional view generally similar to Fig. 1 but showing one of the clutching members in an advanced stage of clutching shift.

Referring to the drawing, the invention is embodied in a transmission having a plurality of speed ratios and comprising a driving shaft 10 having gear teeth 11 in constant mesh with a countershaft gear 12, a set of clutch teeth 13 and a friction surface 14 defining a portion of a cone. A second countershaft gear 15 is in constant mesh with teeth 16 of a gear 17 rotatably mounted on a driven shaft 18, the gear 17 including a set of clutch teeth 19 and a friction surface 20 defining a portion of a cone. A hub 21 is splined and axially fixed on the shaft 18 and is axially undercut to provide a radially outer rim 21' having external spline teeth 22.

A sleeve 23 has internal spline teeth 24 engaged with the spline teeth 22 of the hub 21 for drive with the latter and is adapted to be shifted axially from the Fig. 1 neutral position to selectively clutch with the teeth thereof, with the teeth 13 of shaft 10 or teeth 19 of gear 17. When the sleeve is shifted to the left as viewed in Fig. 1 to clutch with the teeth 13 a direct drive is provided between the shafts 10 and 18, and when shifted to the right to clutch with the teeth 19 of gear 17 the drive between the shafts is through the countershaft gearing. A yoke 25 is suitably actuated in any well known manner to shift the sleeve 23 as aforesaid.

In order to facilitate clutching engagement of the sleeve with the sets of clutch teeth 13, 19 and prevent clashing of the clutch teeth due to difference in rotational speed, I have provided a pair of blocker-synchronizer ring-like members 26, 27. The member 26 is mounted on the cone 14 having a friction surface adapted to be urged into frictional engagement therewith, and having blocker means in the form of teeth 28 disposed axially between the sleeve 23 and clutch teeth 13. The blocker 27 is mounted on the cone 20 to frictionally engage the surface thereof and has blocker teeth 29 interposed axially between the sleeve 23 and clutch teeth 19.

The rim 21' has recesses, three in number, equally spaced circumferentially one relative to the other, in each of which is disposed an actuator or strut 30 for rotation with the hub 21, each such actuator being radially within the spline teeth 24 and registering circumferentially with one thereof as more particularly shown in Fig. 2. Each actuator 30 has sufficient clearance with the bottom of its recess and the registering spline tooth 24 as to be radially movable in its recess. In order to provide a drive between the members 26, 27 and hub 21, each actuator 30 has a projection 31 extending into a registering recess 32 of the blocker member 26 and a second projection 33 extending into a recess 34 of the member 27, each such projection and its registering recess having rotative clearance sufficient to accommodate movement of either members 26, 27 between a first position wherein the blocking teeth thereof are so aligned with the spline teeth 24 of sleeve 23 as to block clutching shift of the latter and a second position wherein the blocking teeth are disposed out of blocking relation. Generally, when the actuator projections are at one or the other circumferential extreme of its registering recess, the blocker teeth are disposed in blocking position as aforesaid.

The actuators or struts 30 are adapted to be shifted with the sleeve 23 during clutching shift thereof to move a blocker member 26, 27 axially to frictionally engage the same with the cone friction surface on which it is mounted and for this purpose the actuators are releasably connected with the sleeve 23. Each actuator has a detent or projection 35 and spline tooth 24 registering therewith has a series, three in number, of axially spaced indentations 36 in which the detent is selectively positioned as more fully set forth.

A pair of axially spaced similar split spring rings 37 engage the actuators 30 for yieldably urging the same radially outwardly. The outwardly thrust against the actuators is of a predetermined magnitude sufficient to insure maintenance of the releasable connection between the sleeve 23 and actuators until the selected blocker 26, 27 has been urged into that degree of frictional engagement with its associated cone necessary to first establish the blocker teeth in blocking position as aforesaid and thereafter to bring the clutching parts into approximate synchronization in order that clutching engagement be had without clashing of the teeth.

As shown more particularly in Fig. 2 each spring 37 is non-rotatably engaged with the actuators 30 by means of an offset 38 thereof receiving one of the actuators 30. Each spring 37 has a continuous semi-cylindrical portion 39 of 180° above the line 40 and engaged at the offset 38 with the aforesaid one actuator and other portions each equally spaced circumferentially from the line 40 respectively engaging the other actuators. The thrust of each spring against the latter actuators develops a thrust component directed to the actuator at the offset 38 so that a radially outer thrust of equal magnitude is directed against each actuator. To permit of this equal loading of each actuator, each spring 37 is so radially spaced from the adjacent inner periphery of the hub rim 21' that the entire thrust thereof is directed against the actuators 30.

A typical operation of the mechanism will be described in connection with effecting the direct drive connection from a neutral position as illustrated in Fig. 1. With the clutching parts operating asynchronously, the sleeve 23 is shifted to the left carrying with it the actuators 30. The latter abut the blocker 26 and urge the same to the left to engage the friction surface thereof with the cone surface 14. Normally, the member rests on its cone and the presence of an oil film therebetween may be sufficient to establish the blocking position of the member 26. Otherwise, the initial movement of the latter establishes this blocking position and subsequent shift of the sleeve and actuators places the friction surfaces under such engagement as to bring the shaft 10 and teeth 13 into approximate synchronization with the sleeve 23. During this subsequent movement, the sleeve engages the chamfered edge of the teeth 28 to exert axially and circumferentially directed thrust components thereagainst. As the parts are brought into approximate synchronization the member 26 rotates to a non-blocking position, the connection between each actuator 30 and sleeve 23 is released and the sleeve is moved to a first position by advancing the teeth 24 thereof through the blocker teeth 28 to the position shown in Fig. 3, in which position each projection 35 has entered another of the indentations 36 of the series registering therewith, and establishes a further releasable connection between the sleeve and actuators. This connection serves to urge the member 26 into engagement with the cone friction surface upon further movement of the sleeve from the Fig. 3 position to a third position to clutch with the teeth 13. This latter engagement of the member 26 with its cone acts to maintain the previously established synchronization which might otherwise be lost, for example, in the event of a relatively slow shift of the sleeve or a hesitation in the shift between the first position of the sleeve, as shown in Fig. 3, and the third or clutching position. Thus the second successive detent connection between the sleeve and struts represents an improvement over those synchromesh structures wherein the thrust transmitting connection between the sleeve and synchronizer member ceases when the sleeve has advanced to the position shown in Fig. 3. While the foregoing clutching movement of the sleeve 23 has been described as stages of advancement, it will be understood that the same is normally a continuous one.

Each blocker 26, 27 has a ring bearing clearance with its cone and should be maintained in concentric relation thereto during movement to frictionally engage the same under synchronizing pressure. Inasmuch as the actuators engage the members 26, 27 at equally spaced circumferential locations it is important that the pressure exerted thereagainst at such locations be of the same magnitude. Should one of the actuators exert a force different from that of another, a non-concentric relationship will exist which will produce localized wear of the blocker member and early failure thereof in properly synchronizing the structures. The illustrated construction evenly loads the actuators and this condition produces the evenly directed synchronizing pressure.

Although but one specific embodiment of the invention has herein been shown and described, it will be understood that various changes in the size, shape and arrangement of parts may be made without departing from the spirit of the invention.

I claim:

1. In a power transmitting mechanism comprising a driving structure having a set of clutch teeth, a driven structure including a toothed sleeve adapted to clutchingly engage said teeth, a member having blocking means intermediate said set of clutch teeth and said sleeve movable between positions respectively in blocking and non-blocking relation with respect to clutching shift of said sleeve and having a surface frictionally engageable with said driving structure, said sleeve being axially shiftable from a neutral position to a first position wherein said blocker means is in said non-blocking relation and to a third position to clutch with said set of clutch teeth when said blocking means is in said non-blocking relation, a plurality of circumferentially spaced actuators shiftable to engage with said blocker member to thrust said surface thereof into frictional engagement with said driving structure as said sleeve is moved from said neutral position to said first position and from the latter position to said third position, and means cooperating with said sleeve and each of said actuators forming successive releasable connections therebetween for shifting said actuators as aforesaid as said sleeve is moved from said neutral position and from said first position.

2. In a power transmitting mechanism comprising a driving structure having a set of clutch teeth, a driven structure including a toothed sleeve adapted to clutchingly engage said teeth, a member having blocking means intermediate said set of clutch teeth and said sleeve movable between positions respectively in blocking and non-blocking relation with respect to clutching shift of said sleeve and having a surface frictionally engageable with said driving structure, said sleeve being axially shiftable from a neutral position to a first position wherein said blocker means is in said non-blocking relation and to a third position to clutch with said set of clutch teeth when said blocking means is in said non-blocking relation, a plurality of circumferentially spaced actuators shiftable to engage with said blocker member to thrust said surface thereof into frictional engagement with said driving structure as said sleeve is moved from said neutral position to said first position and from said first position to said third position, and means cooperating with said sleeve and each of said actuators forming successive releasable connections therebetween for shifting said actuators as aforesaid as said sleeve is moved from said neutral position and from said first position, and spring means yieldably and releasably urging said actuators into connection-forming relation with said sleeve.

3. In a power transmitting mechanism comprising a driving structure having a set of clutch teeth, a driven structure including a toothed sleeve adapted to clutchingly engage said teeth, a member having blocking means intermediate said set of clutch teeth and said sleeve movable between positions respectively in blocking and non-blocking relation with respect to clutching shift of said sleeve and having a surface frictionally engageable with said driving structure, said sleeve being axially shiftable from a neutral position to a first position wherein said blocker means is in said non-blocking relation and to a third position to clutch with said set of clutch teeth when said blocking means is in said non-blocking relation, a plurality of circumferentially spaced actuators shiftable to engage with said blocker member to thrust said surface thereof into frictional engagement with said driving structure as said sleeve is moved from said neutral position to said first position and from the latter to said third position, and means cooperating with said sleeve and each of said actuators forming successive releasable connections therebetween for shifting said actuators as aforesaid as said sleeve is moved from said neutral and said first positions, said connecting means including a series of axially spaced indentations registering with each actuator and each actuator having a detent respectively engaged in the indentations of the registering series when said sleeve is in said neutral and first positions, the detent and indentation engaged for said first position being released when said sleeve is clutched with said set of clutch teeth.

4. In a power transmitting mechanism comprising a driving structure having a set of clutch teeth, a driven structure including a toothed sleeve adapted to clutchingly engage said teeth, a blocker member having a set of blocking teeth intermediate said set of clutch teeth and said sleeve movable between positions respectively in blocking and non-blocking relation with respect to clutching shift of said sleeve and having a surface frictionally engageable with said driving structure, said sleeve being axially shiftable from a neutral position to a first position wherein said blocker means is in said non-blocking relation and a third position to clutch with said set of clutch teeth, a plurality of actuators equally spaced circumferentially one relative to the other shiftable to engage with said blocker member to thrust said surface thereof into frictional engagement with said driving structure, and means cooperating with said sleeve and each of said actuators forming successive releasable connections therebetween for shifting said actuators as aforesaid as said sleeve is moved from said neutral and said first positions, said connecting means including a series of axially spaced indentations registering with each actuator and each actuator having a detent respectively engaged in the indentations of the registering series when said sleeve is in said neutral and first positions, and a contracted spring ring yieldably and releasably urging said actuators into connection-forming engagement with said sleeve, said ring having such radial clearance with the associated structure as to direct the entire thrust thereof against said actuators.

JAY C. AUTEN.

REFERENCES CITED

The following references are of record in the file of this patent:

UNITED STATES PATENTS

| Number | Name | Date |
| --- | --- | --- |
| 2,160,091 | Simpson et al. | May 30, 1939 |
| 2,221,899 | White et al. | Nov. 19, 1940 |
| 2,221,900 | White et al. | Nov. 19, 1940 |
| 2,372,733 | Orr | Apr. 3, 1945 |

FOREIGN PATENTS

| Number | Country | Date |
| --- | --- | --- |
| 403,319 | Great Britain | Dec. 21, 1933 |